US012389220B2

(12) United States Patent
Choukir et al.

(10) Patent No.: US 12,389,220 B2
(45) Date of Patent: Aug. 12, 2025

(54) OPPORTUNISTIC RELAY AMONG MOBILE COMMUNICATION DEVICES

(71) Applicant: Cisco Technology, Inc., San Jose, CA (US)

(72) Inventors: Amine Choukir, Lausanne (CH); Pascal Thubert, Roquefort les Pins (FR); Domenico Ficara, Essertines-sur-Yverdon (CH); Jean-Philippe Vasseur, Combloux (FR)

(73) Assignee: Cisco Technology, Inc., San Jose, CA (US)

( * ) Notice: Subject to any disclaimer, the term of this patent is extended or adjusted under 35 U.S.C. 154(b) by 159 days.

(21) Appl. No.: 18/368,997

(22) Filed: Sep. 15, 2023

(65) Prior Publication Data

US 2025/0097697 A1 Mar. 20, 2025

(51) Int. Cl.
*G06F 21/00* (2013.01)
*G06F 21/57* (2013.01)
(Continued)

(52) U.S. Cl.
CPC ....... *H04W 12/0431* (2021.01); *H04W 76/15* (2018.02); *H04W 88/04* (2013.01)

(58) Field of Classification Search
CPC .......................... H04W 12/0431; H04W 76/15
(Continued)

(56) References Cited

U.S. PATENT DOCUMENTS 9,078,270 B2 7/2015 Ji et al.
9,467,835 B2 10/2016 Hiben
(Continued)

FOREIGN PATENT DOCUMENTS

WO 2022194340 9/2022
WO 2023011904 2/2023
WO WO-2023071587 A1 * 5/2023

OTHER PUBLICATIONS

Koushik C.P., et al., "Heuristic Relay-Node Selection in Opportunistic Network Using RNN-LSTM Based Mobility Prediction", Wireless Personal Communications, Springer, May 23, 2020, vol. 114, No. 3, 26 Pages.
(Continued)

*Primary Examiner* — Haresh N Patel
(74) *Attorney, Agent, or Firm* — BEHMKE INNOVATION GROUP LLC; James M. Behmke

(57) ABSTRACT

In one embodiment, a method is disclosed comprising monitoring dynamic locations of a plurality of mobile communication devices within a physical area covered by a wireless communication network, wherein keys are distributed to the mobile communication devices at association time; determining that a particular mobile communication device should have a relay for communication with the network based on a first location of the particular mobile communication device and inadequate wireless communication characteristics at the first location; selecting an opportunistic relay device from the mobile communication devices based on a second location of the opportunistic relay device and adequate wireless communication characteristics of the opportunistic relay device within the network and to the first location from the second location; and directing the opportunistic relay device to relay communications for the particular mobile communication device at the first location, wherein the communications are encrypted based on the keys.

20 Claims, 6 Drawing Sheets

(51) Int. Cl.
*H04W 12/0431* (2021.01)
*H04W 76/15* (2018.01)
*H04W 88/04* (2009.01)

(58) Field of Classification Search
USPC .......................................................... 380/270
See application file for complete search history.

(56) References Cited

U.S. PATENT DOCUMENTS

| | | | | | |
|---|---|---|---|---|---|
| 11,363,520 | B2 | 6/2022 | Damnjanovic | | |
| 2002/0193121 | A1 * | 12/2002 | Nowak | H04W 76/50 | 342/357.29 |
| 2012/0003971 | A1 * | 1/2012 | Ishikawa | H04B 7/2606 | 455/422.1 |
| 2012/0039246 | A1 * | 2/2012 | Zhang | H04W 68/02 | 370/315 |
| 2013/0244569 | A1 * | 9/2013 | Dunn | H04B 7/15507 | 455/11.1 |
| 2014/0120967 | A1 * | 5/2014 | Purnadi | H04B 17/345 | 455/501 |
| 2015/0095124 | A1 * | 4/2015 | Felt | G06Q 30/0259 | 705/14.57 |
| 2016/0041252 | A1 * | 2/2016 | Cintron-Aponte | G01S 19/13 | 342/385 |
| 2021/0084603 | A1 * | 3/2021 | Zisimopoulos | H04W 36/04 | |
| 2021/0084609 | A1 * | 3/2021 | Zisimopoulos | H04W 64/003 | |
| 2022/0036723 | A1 * | 2/2022 | Varughese | H04W 4/80 | |
| 2022/0369343 | A1 * | 11/2022 | Xue | H04L 5/0055 | |

OTHER PUBLICATIONS

Jian-Bin, et al., "Prediction Based Relay Selection Method in Opportunistic Vehicular Networks", Ruan Jian Xue Bao / Journal of Software, 2015, 26(7), pp. 1730-1741.

Ge, et al., "An Efficient Opportunistic Routing Based on Prediction for Nautical Wireless Ad Hoc Networks", J. Marine Science and Engineering 2022, 10, 789, 12 pages, MDPI.

Feng, et al., "Prediction-based Dynamic Relay Transmission Scheme for Wireless Body Area Networks", 2013 IEEE 24th International Symposium on Personal, Indoor and Mobile Radio Communications: Mobile and Wireless Networks, pp. 2539-2544.

* cited by examiner

300

OPPORTUNISTIC RELAY AMONG MOBILE COMMUNICATION DEVICES

TECHNICAL FIELD

The present disclosure relates generally to computer networks, and, more particularly, to opportunistic relay among mobile communication devices.

BACKGROUND

In today's industrial landscape, automation is on the rise across sectors, from factories to amusement parks and food services. This shift towards automation depends heavily on uninterrupted, highly reliable network connectivity. However, as automation increases, so does the demand for network resources. This leads to congestion, compromising determinism, network performance, and capacity. In this respect, contemporary network connectivity approaches are insufficient to reliably support the level of automation that industry desires. As such, while demand for ultra-reliable networks capable of supporting dense, automated deployments throughout the entirety of a deployment environment is increasing, traditional network approaches continue to struggle to meet this demand and represent a bottleneck with respect to industrial automation.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
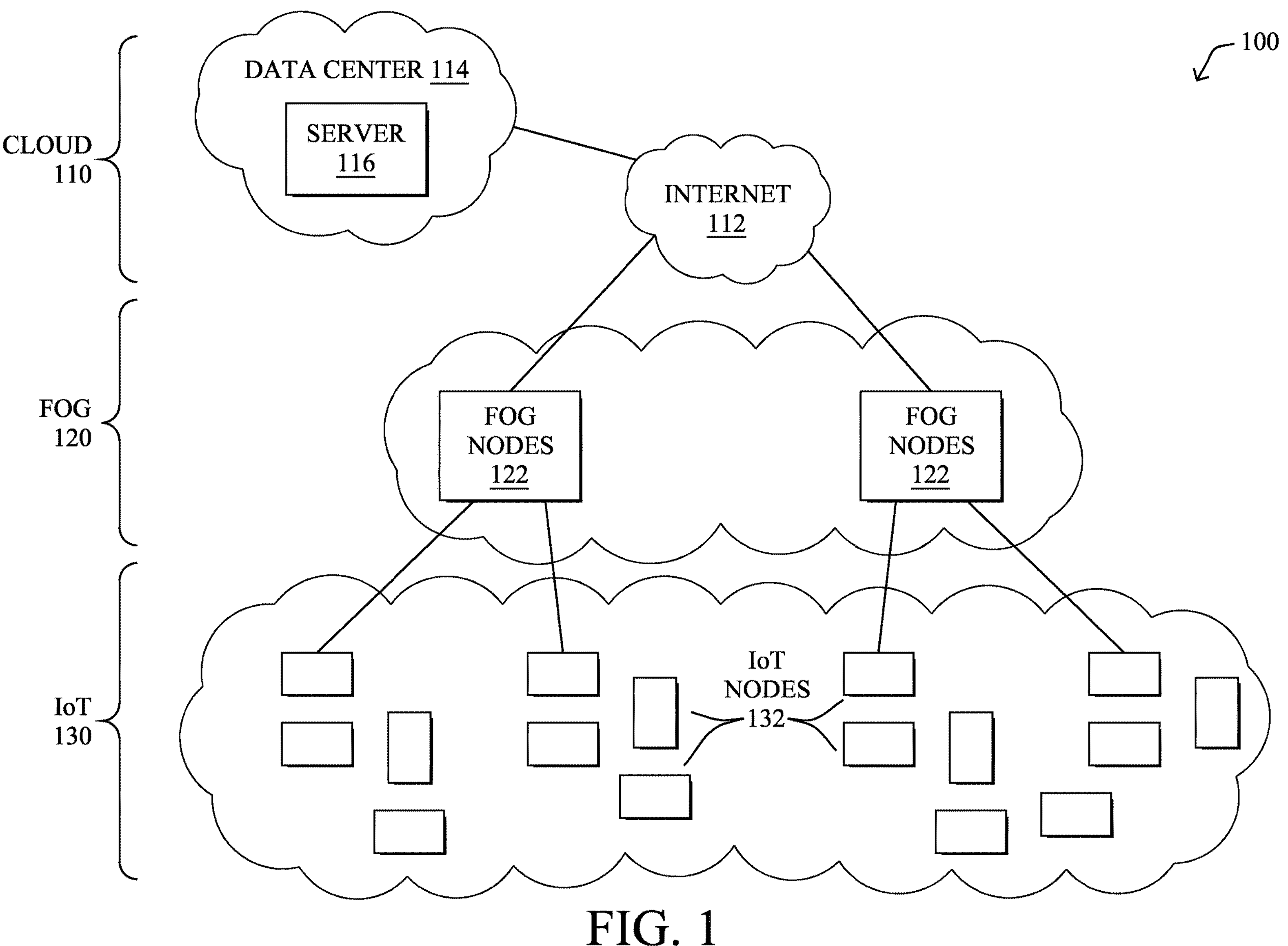
FIG. 1 is a schematic block diagram of an example simplified computer network.

According to one or more embodiments of the disclosure, dynamic locations of a plurality of mobile communication devices within a physical area covered by a wireless communication network monitored. Keys may be distributed to the plurality of mobile communication devices at association time. It may be determined that a particular mobile communication device of the plurality of mobile communication devices should have a relay for communication with the wireless communication network based on a first location of the particular mobile communication device and/or inadequate wireless communication characteristics at the first location. An opportunistic relay device may be selected from the plurality of mobile communication devices based on a second location of the opportunistic relay device and adequate wireless communication characteristics of the opportunistic relay device within the wireless communication network and to the first location from the second location. The opportunistic relay device may be directed to relay communications for the particular mobile communication device at the first location. The communications may be encrypted based on the keys distributed at association time.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network (e.g., computer network 100) illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example computer network 100, three illustrative layers are shown. Namely, cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT device layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the computer network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
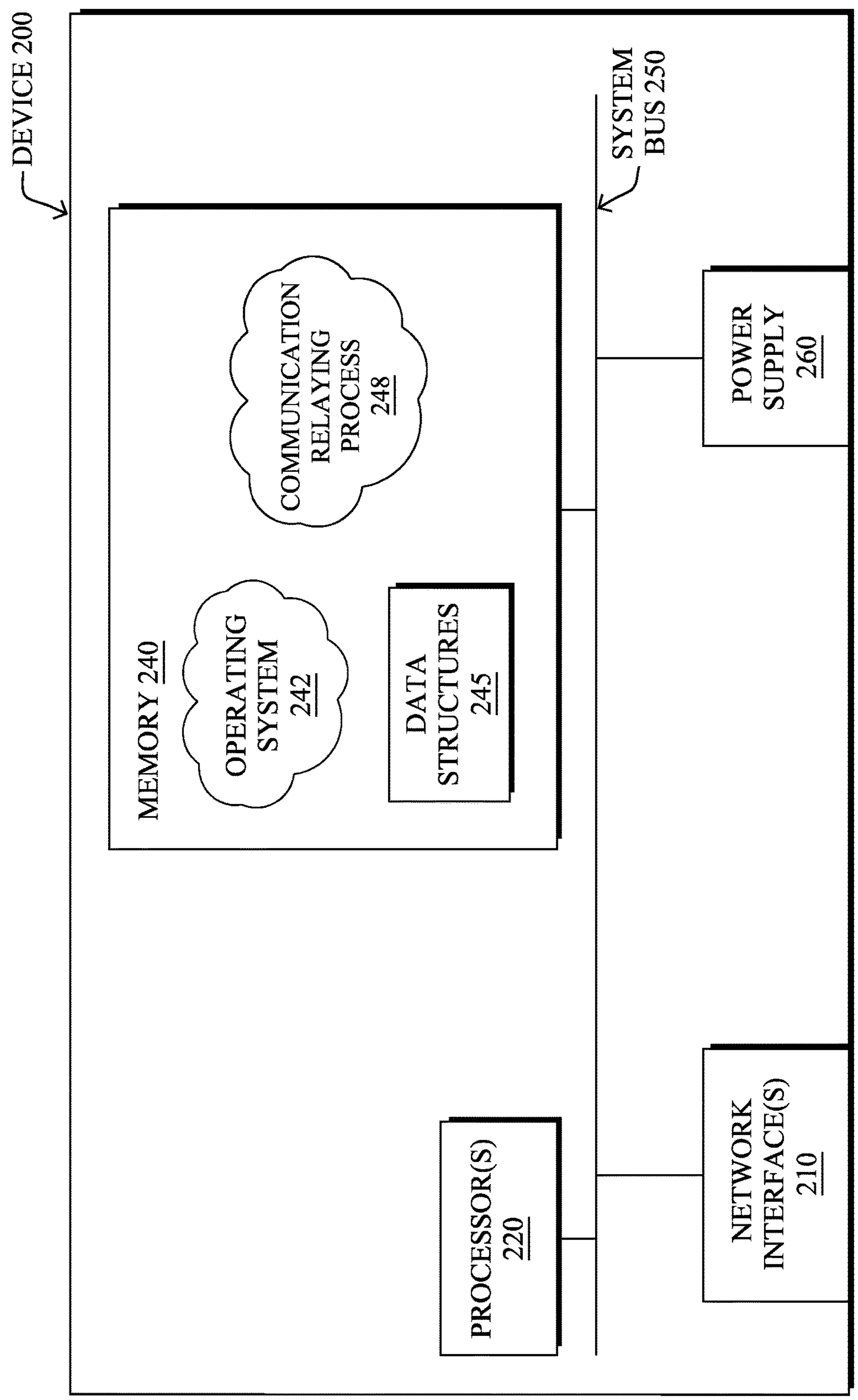
FIG. 2 illustrates an example network device/node.

FIG. 2 is a schematic block diagram of an example node/device 200 that may be used with one or more embodiments described herein. As shown, device 200 may comprise one or more of the communication interface(s) 210 (e.g., wired, wireless, etc.), at least one processor (e.g., processor 220), and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, etc. Note that the node/device 200 may have multiple different types of communication interface(s) 210, e.g., wireless and wired/physical connections, and that the view herein is merely for illustration.

The memory 240 comprises a plurality of storage locations that are addressable by the processor(s) (e.g., processor 220) and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a communication relaying process 248. Communication relaying process 248 may be executable by node/device 200 to organize and orchestrate the secure use opportunistic relay devices in a wireless network be selecting an optimal set of opportunistic relays at any given time, facilitating optimal redundancy levels used by wireless nodes, and/or implementing a communication scheme that supports 802.11 security when using the identified opportunistic relay.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Opportunistic Relay Among Mobile Communication Devices

As noted above, while demand for ultra-reliable networks capable of supporting dense, automated deployments is increasing, traditional network approaches continue to struggle to meet this demand and represent a bottleneck with respect to industrial automation. Ultra-reliable wireless backhaul systems are designed to provide exceptionally high levels of reliability and availability and are often used in contexts where network downtime can have severe consequences, such as in industrial automation, critical infrastructure, or emergency services. This approach allows traditional access points to participate in a point-to-multipoint mesh overlay that works to monitor and identify changes in the RF environment and/or outages as they occur in order to route around problems in the network.

The ultra-reliable wireless backhaul systems can provide enhanced reliability in wireless networks through the use of link redundancy. In these systems, a client node is equipped with multiple radios that connect to different access points (APs), helping to ensure reliability by providing spatial diversity among the APs that service the client. As a tradeoff, though, this also means there is greater spectrum utilization than would otherwise be the case. In dense deployments, such as with rides at amusement parks or automated equipment at factories, where multiple nodes are moving within a limited space, this can cause congestion that is detrimental to determinism.

Furthermore, given the dynamic and challenging conditions often present in ultra-reliable wireless backhaul system deployments, consistent reliable and resilient network connectivity that meets certain threshold levels across the entire environment is very difficult to achieve and maintain. For example, topography, object interference, signal interference, equipment setup errors/limitations, equipment degradation/failure, weather conditions, RF characteristics, etc. can all contribute to inconsistent network performance and/or spotty coverage in certain portions of an environment. Attempts to address these shortcomings through the endless addition of additional network infrastructure and extensive redundancy efforts frequently fall short of achieving full coverage of an area and, instead, fruitlessly consume additional resources.

In contrast, the techniques described herein introduce a mechanism to organize and orchestrate the secure use of opportunistic relay devices in a wireless network. This approach takes advantage of the plurality of mobile communication client nodes already operating within a wireless communication network to opportunistically collaborate in delivering redundancy and additional resiliency only when they are needed. This may be accomplished through selection of an optimal set of opportunistic relays at any given time, facilitation of optimal redundancy levels used by wireless nodes, and/or implementation of a communication scheme that supports 802.11 security when using the identified opportunistic relay. By having certain client nodes (e.g., opportunistic relay devices) relay wireless communications on behalf of other nodes, the existing issues (e.g., spectrum strain, resource over consumption, spotty network connectivity, etc.) with ultra-reliable wireless backhaul systems can be eliminated, and ultra-high reliability may be reliably and resiliently maintained even among densely automated deployments.

Moreover, the described techniques optimize relay usage to resolve critical underlying variables such as how much redundancy should be used by any node at any given time. Too much redundancy is not energy efficient and represents a waste of network resources, such as bandwidth. In addition, the described techniques resolve when any given node should function as an opportunistic relay. As with the amount of redundancy used by a node, the amount of time a node serves as a relay impacts efficiency and resource utilization. Furthermore, the described techniques resolve how to support security when utilizing an opportunistic relay communication scheme. For instance, 802.11 may rely on stream ciphers for securing the radio link between an STA and an AP. This may require a full history of the communication to decipher an 802.11 MAC protocol data unit (MPDU) from any listener, which is important from a security standpoint, but may prevent the transparent handling of STA data by a neighboring AP, which might provide spatial diversity and, therefore, reliability to the STA communication. More precisely, in the context of the above, the opportunistic relay may deliver STA packets to a neighbor AP of the currently associated AP.

Specifically, according to one or more embodiments of the disclosure as described in detail below, a method may comprise: monitoring, by a process, dynamic locations of a plurality of mobile communication devices within a physical area covered by a wireless communication network, wherein keys are distributed to the plurality of mobile communication devices at association time; determining, by the process, that a particular mobile communication device of the plurality of mobile communication devices should have a relay for communication with the wireless communication network based on a first location of the particular mobile communication device and inadequate wireless communication characteristics at the first location; selecting, by the process, an opportunistic relay device from the plurality of mobile communication devices based on a second location of the opportunistic relay device and adequate wireless communication characteristics of the opportunistic relay device within the wireless communication network and to the first location from the second location; and directing, by the process, the opportunistic relay device to relay communications for the particular mobile communication device at the first location, wherein the communications are encrypted based on the keys.

Illustratively, the techniques described herein may be performed by hardware, software, and/or firmware, such as in accordance with the communication relaying process 248, which may include computer executable instructions executed by the processor 220 (or independent processor of communication interface(s) 210) to perform functions relating to the techniques described herein.

Figure 3:
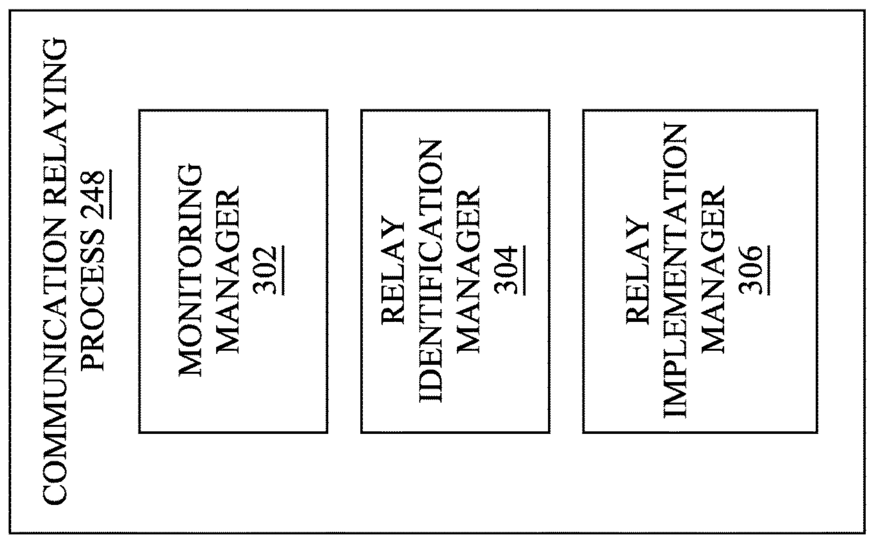
FIG. 3 illustrates an example of an architecture for opportunistic relaying among mobile communication devices.

Operationally, FIG. 3 illustrates an example of an architecture 300 for opportunistic relaying among mobile communication devices in a wireless communication network. At the core of architecture 300 is communication relaying process 248, which may be executed by one or more devices. For example, communication relaying process 248 may be executed by a network controller for a wireless communication network. In some instances, this may include a network controller for an ultra-reliable wireless backhaul infrastructure. Of course, all or parts of the communication relaying process 248 may be executed by another device (e.g., an access point, a mobile communication device, etc.) of the wireless communication network and/or any device communicatively coupled thereto. In various embodiments, communication relaying process 248 may be executed as part of and/or in association with a Warehouse Execution Systems (WES) and/or Enterprise Resource Planning (ERP) systems.

As shown, communication relaying process 248 may include monitoring manager 302, relay identification manager 304, and/or relay implementation manager 306. As would be appreciated, the functionalities of these components may be combined or omitted, as desired. In addition, these components may be implemented on a singular device or in a distributed manner, in which case the combination of executing device can be viewed as their own singular device for purposes of executing communication relaying process 248.

During execution, monitoring manager 302 may monitor aspects of a wireless communication network. This may include monitoring data associated with access points, radio frequency conditions, network coverage, network performance, client nodes, client node movement, etc. The monitored data may be utilized to determine (e.g., observe, measure, model, predict, etc.) wireless communication characteristics for each client node and/or at various locations about the environment where the wireless communication network is deployed.

The wireless communication characteristics may include client node task execution performance metrics, client node communication performance metrics, network performance metrics, etc. Essentially, the wireless communication characteristics may include, among other things, any indication of the client node's ability to connect to the wireless communication network, the performance of that connection in communicating data once established, and/or the performance of task execution by that client node at various locations about the environment where the wireless communication network is deployed. In some instances, these wireless communication characteristics may be referenced against minimum threshold levels representative of ultra-high reliability guarantees.

The client nodes may be mobile communication devices such as automated industrial equipment, autonomous mobile robots, amusement park vehicles, inventory picking and management vehicles, automated service robots, etc. These mobile communication devices may be configured to autonomously and/or according to preprogramming or real-time instructions about a physical area (e.g., an environment such as a warehouse, a factory, an amusement park, a roadway, a path, a segment of airspace, a portion of a body of water, etc.) covered by the wireless communication network and/or to perform tasks (hauling, loading, stacking, picking, moving, etc.) within that physical area.

The mobile communication devices may be associated to and/or utilize the wireless communication network to send and/or receive data communications that may be utilized in their navigation and/or task performance. For instance, mobile communication devices may associate to a wireless communication network and/or conduct data communications through access points (APs) to the network. In various embodiments, the mobile communications devices may be assigned a relay key at the time of their association to the wireless communication network. This relay key may be configured for use to encrypt relayed data communications (e.g., packets, etc.). As discussed in greater detail later on the use of non-stream cipher and a relay key distributed at association time to encrypt relayed packet may be utilized such that a neighboring AP can recover the original frame and process it further, locally.

During execution, relay identification manager 304 may determine that a particular mobile communication device of a plurality of mobile communication devices that are associated to the wireless communication network should have a relay for communication with the wireless communication network. This determination may be made based on a predicted and/or observed location of the particular mobile communication device and precited and/or observed wireless communication characteristics for the particular mobile communication device at that location as determined by monitoring manager 302.

For instance, the relay identification manager 304 may determine that the particular mobile communication device is positioned in, entering, or will enter a first location in a physical area where the wireless communication network is deployed. Relay identification manager 304 may reference the predicted and/or observed wireless communication characteristics associated with that first location. Relay identification manager 304 may determine from this analysis that the particular mobile communication device should have a relay when, at the first location, the particular mobile communication device is observed or predicted to experience inadequate wireless communication characteristics (e.g., as compared against one or more threshold).

For example, the relay identification manager 304 may determine that the particular mobile communication device should have a relay when it has entered or is about to enter a 'dark area' (e.g., an area where the existing connectivity conditions do not provide threshold ultra-high reliability guarantees and/or reliable network connectivity or network performance with respect to the particular mobile communication device) within the network deployment environment.

Once it has identified that the particular mobile communication device should have a relay, the relay identification manager 304 may select another mobile communication device from the plurality of mobile communication devices associated to the wireless communication network to serve as an opportunistic relay device for the particular mobile communication device in need of a relay. The mobile communication device selected to act as the opportunistic relay may be selected based on a predicted and/or observed location of the opportunistic relay candidate mobile communication device and precited and/or observed wireless communication characteristics for the opportunistic relay candidate mobile communication device at that location as determined by monitoring manager 302.

For instance, the relay identification manager 304 may determine that the opportunistic relay candidate mobile communication device is positioned at, entering, or will enter a second location in the physical area where the wireless communication network is deployed. Relay identification manager 304 may reference the predicted and/or observed wireless communication characteristics associated with that second location. Relay identification manager 304 may select, based on this analysis, the opportunistic relay candidate mobile communication device to serve as the opportunistic relay for the particular mobile communication device when, at the second location, the opportunistic relay candidate mobile communication device is observed or predicted to experience adequate wireless communication characteristics (e.g., at or above threshold levels) with respect to its connection to the wireless communication network and/or to the particular mobile communication device. As may be appreciated, this determination may involve a determination of the relative proximity of the opportunistic relay candidate mobile communication device to these other network elements.

For example, the relay identification manager 304 may determine that the opportunistic relay candidate mobile communication device should operate as the opportunistic relay for communication from the particular mobile communication device based at least in part on it being located within an area where it has access to reliable network connectivity with ultra-high reliability guarantees while the particular mobile communication device is within the 'dark area.' In addition, the relay identification manager 304 may determine that the opportunistic relay candidate mobile communication device should operate as the opportunistic relay for communication from the particular mobile communication device based at least in part on it being located within an area where it has access to reliable connectivity with the particular mobile communication device while it is within the 'dark area.'

During execution, relay implementation manager 306 may direct the determined opportunistic relay device to relay communications for the particular mobile communication device at the first location. For example, relay implementation manager 306 may cause the opportunistic relay device to establish and/or utilize a communication link to the particular mobile communication device and/or a communication link to an access point of the wireless communication network and begin relaying data from the particular mobile communication device to the access point.

In various embodiments, relay implementation manager 306 may generate/modify navigation instructions. The navigation instructions may be communicated to the particular mobile communication device and/or the opportunistic relay device. These navigation instructions may be configured to cause positioning and/or timing of movement of the particular mobile communication device and/or the opportunistic relay device that is optimized to facilitate the communication relay between the participants. For example, the relay implementation manager 306 may cause the particular mobile communication device and/or the opportunistic relay device to slow, accelerate, steer, etc. in such a manner that it precisely times the location of the particular mobile communication device and/or the opportunistic relay device relative to each other, to the access point, and/or to other elements of the wireless communication network. For instance, the opportunistic relay device may be slowed down from a planned speed along its picking route in order to prevent it from losing or degrading its connection with the particular mobile communication device and/or an access point between which it is acting as a relay while the particular mobile communication device is located within the 'dark area.'

From a security standpoint, the communications being relayed by the opportunistic relay device may be encrypted. For example, these communications may be encrypted utilizing the key distributed to the particular mobile communication device at association time. For instance, a non-stream cipher and the relay key distributed at association time may be utilized to encrypt relayed packets such that a neighboring AP can recover the original frame and process it further, locally.

It should be appreciated that the examples given above are described in terms of involvement of a single opportunistic relay device to simplify their explanation. However, by extending the same techniques described with respect to a single opportunistic relay device, more complex architectures including involving multiple opportunistic relay devices participating in relay chains, multiple opportunistic relay device relay timing schemes, etc. may be achieved.

Figure 4A:
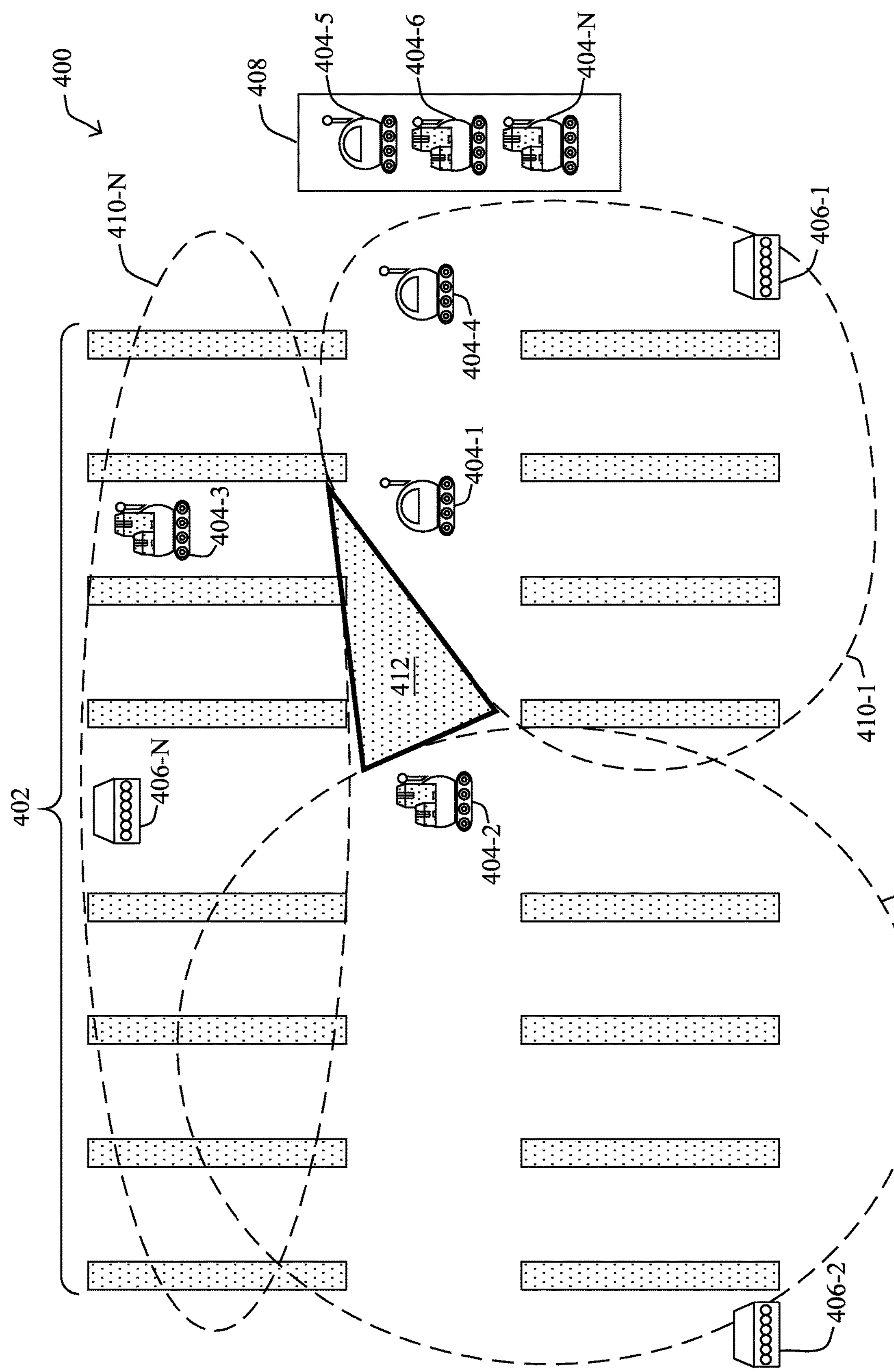
FIGS. 4A-4B illustrate an example of an environment for opportunistic relaying among mobile communication devices.
Figure 4B:
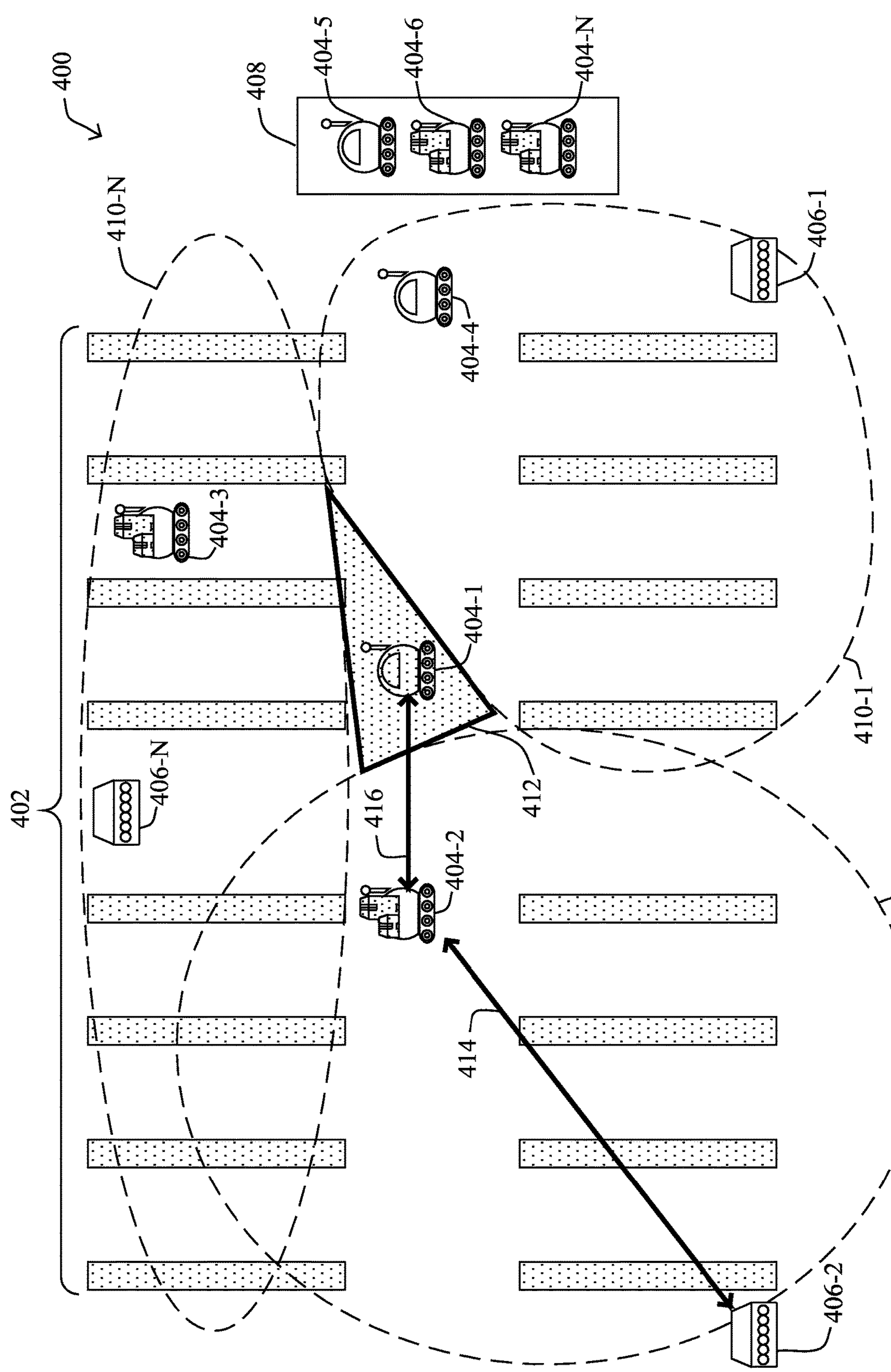

FIGS. 4A-4B illustrate an example of an environment 400 for opportunistic relaying among mobile communication devices, according to various embodiments. For instance, environment 400 may be a warehouse, dock, post office, distribution center, or any indoor or outdoor location in which automated tasks may be performed (e.g., a location where items may be placed for storage and retrieved at a later time). In further embodiments, environment 400 may take the form of a vehicle, such as the cargo hold of a ship, a trailer of a truck, the hold of an aircraft, or the like.

In environment 400, a large density of mobile nodes 404 (e.g., 404-1 . . . 404-N) such as mobile communication devices may be deployed and/or operating. For example, each of the mobile nodes 404 may be an autonomous mobile robot (AMR) configured to pick orders of goods from inventory racks 402 throughout the environment 400.

In general, each of the mobile nodes 404 may include a propulsion system that propels the robot (e.g., an engine coupled to wheels, treads, etc.), one or more sensor systems (e.g., infrared, sonar, video, etc.), a communication system (e.g., wireless, hardwired port, etc.), and a computer control system coupled to the other systems that provides supervisory control over the other systems. Each of the mobile nodes 404 may be equipped with multiple radios, allowing it to leverage multiple wireless links at any given time, thereby providing redundancy to its communications and helping to improve reliability.

In some embodiments, the mobile nodes 404 may also include mechanisms to automatically load and/or unload items, such as forklifts, mechanical claws, or the like. In other embodiments, the mobile nodes 404 may require the assistance of human workers to load and unload items to and from the AMRs. In some instances, environment 400 may also include a pack-out area 408 that has been designated as the place at which the mobile nodes 404 are to unload their retrieved items.

In various embodiments, a wireless communication network may be deployed within environment 400. The wireless communication network may be deployed as an ultra-reliable wireless backhaul systems that may be configured to support radio communication configurations such as point-to-point, point-to-multipoint, and/or mesh configurations.

The wireless communication network may include access points (APs 406 (e.g., 406-1 . . . 406-N)) that wirelessly engage in data communication with any of the mobile nodes 404 that are associated to them. These APs 406 may receive data communications from mobile nodes 404 and pass these communications to the core of the wireless communication network and/or may send data communications from the network to any associated ones of the mobile nodes 404.

Each of the APs 406 may provide a wireless signal coverage area 410 (e.g., 410-1 . . . 410-N) within environment 400. A wireless signal coverage area 410 of each of the APs 406 may be an area within which that particular AP can reliably provide network connectivity to any of the mobile nodes 404 located therein.

Often, the wireless signal coverage areas of the APs 406 are not able to provide full coverage at threshold levels across the entirety of an environment 400 where they are deployed. There may be many reasons for this incomplete coverage including topography, object interference, signal interference, equipment setup errors/limitations, equipment degradation/failure, weather conditions, RF characteristics, etc.

Regardless of the cause of this incomplete coverage, the result is that an environment 400 may include one or more of a dark area 412. In dark area 412 there may be no connectivity and/or connectivity that does not provide ultra-high reliability guarantees to the wireless communication network at or above a threshold level. For instance, dark area 412 may be a physical location within environment 400 where inventory racks 402 or other surfaces prevent any of the mobile nodes 404 located therein from establishing a reliable communication link to any of the APs 406 in the area.

As described above, a process (e.g., communication relaying process 248) may be executed by a device in order to provide connectivity to mobile nodes 404 approaching, entering, and/or located in the dark area 412. As noted above, the process may be executed entirely and/or partially by a network controller of the wireless communication network, an AP, a mobile node, in association with a Warehouse Execution System (WES), in association with an Enterprise Resource Planning (ERP) system, and/or any device communicatively coupled to the wireless communication network.

In FIG. 4A, a first mobile node 404-1 is illustrated moving toward dark area 412. Once it reaches dark area 412, the first mobile node 404-1 will be located at a point in the environment 400 where the inventory racks 402 or other surfaces prevent it from forming a reliable link to any of the APs 406 deployed in the area. However, as outlined above, a process may be executed to identify and establish the use of one or more other mobile nodes as opportunistic relays on behalf of first mobile node 404-1. This opportunistic relay may be caused to aid in providing network connectivity to first mobile node 404-1 while it is located in dark area 412.

Opportunistic relay identification can involve monitoring of the wireless communication network components and/or network participants including where they are located and their wireless communication characteristics at each of these locations. Further, the current location of the mobile nodes 404 within environment 400 may be tracked and/or their future locations within environment 400 may be determined (e.g., referenced from a plan, observed, modeled, predicted, etc.).

In this manner, a controller or other device executing the process may be able to predict where each of the mobile nodes 404 will be located at a particular time and/or what their connectivity to each other and/or to APs 406 will look like when they arrive. As such, a controller for the wireless communication network may make an opportunistic relay selection by solving a global optimization problem and using previously recorded RF and location information from the mobile nodes 404 in environment 400.

For example, execution of the process by a controller or other device may yield a determination that first mobile node 404-1 will arrive at dark area 412 at time $T_1$. Therefore, the controller or other device may predict that, at time $T_1$, first mobile node 404-1 will no longer be able to maintain its existing direct communication link with first AP 406-1 (e.g., will be outside first coverage area 410-1) or establish a direct communication link with any other of the APs 406 (e.g., be within second coverage area 410-2 or Nth coverage area 410-N) with suitable RF characteristics to meet threshold network requirements.

However, execution of the process by the controller may, based on the prediction that first mobile node 404-1 is about to reach dark area 412 in a few seconds, request nearby nodes (e.g., such as second mobile node 404-2) or other nodes that may be nearby in a few seconds, to become an opportunistic relay. In some instances, execution of the process may yield the prediction that second mobile node 404-2 will be (or can be caused to be with navigation instructions) within the second coverage area 410-2 at time $T_1$. From there, second mobile node 404-2 would be available and able to establish a first data communication link 414 with second AP 406-2 (e.g., either directly or through intervening network components or mobile nodes 404) and/or be within communication range to establish a second data communication link 416 with first mobile node 404-1 (e.g., either directly or through intervening network components or mobile nodes 404) with suitable RF characteristics to meet threshold network requirements. As such, execution of the process may yield a selection of second mobile node 404-2 to serve as an opportunistic relay for first mobile node 404-1 as it traverses dark area 412.

Thereafter, the controller or other device executing the process may cause the second mobile node 404-2 to begin operating as an opportunistic relay for first mobile node 404-1 and/or position itself accordingly. This can include, as illustrated in FIG. 4B, causing the second mobile node 404-2 1 to establish the first data communication link 414 with second AP 406-2 and/or to establish the second data communication link 416 with first mobile node 404-1. First mobile node 404-1 and/or second mobile node 404-2 may be caused to conduct data communication across the second data communication link. Second mobile node 404-2 may be caused to relay data communications from first mobile node 404-1 to the second AP 406-2 across first data communication link 414. The relayed data communications may be Layer 2-encrypted, as well, to prevent eavesdropping.

Part of establishing and/or utilizing these data communication links may include causing the first mobile node 404-1 and/or the second mobile node 404-2 to navigate in a manner that creates, times, hastens, delays, and/or prolongs establishment and/or utilization of these communication links. For instance, the controller or other device executing the process may cause the first mobile node 404-1 and/or the second mobile node 404-2 to slow, accelerate, steer, etc. so that the establishment, maintenance, and/or termination is precisely timed to provide relay connectivity to the first mobile node 404-1 while it is within dark area 412. In this manner, the amount of time that the second mobile node 404-2 spends operating as an opportunistic relay for first mobile node 404-1 is precisely metered out and minimized to provide just enough redundancy for just long enough to meet threshold network requirements so that spectrum strain and/or resource consumption is minimized while network work performance is maximized.

From a security standpoint, the question remains as to how to ensure that wireless security is preserved, when a data communication is not sent directly to/from an AP. In various embodiments, original BSSID within a data frame may be leverage to lookup the associated AP and deliver the frame to it. The associated AP can then use its local security context to decipher the frame and process it further. In some instances, this may introduce latency and hairpin all the flow to the associated AP.

In further embodiments, a non-stream cipher and a relay key distributed at association time may be leveraged to encrypt relayed data packets. This system may be leveraged so that a neighboring AP can recover the original frame and process it further, locally.

In addition to selecting opportunistic relays in the network, another optimization may be employed that relates to the amount of redundancy used in the wireless communication network at any given time. As noted, each mobile node 404 has N-number of radios and monitors wireless and Layer-2 parameters on them. The controller or other device executing the process may then leverage this telemetry and correlate them (position, orientation, time, etc.) with a failure rate or other metric for each link. When the predicted failure grows over a certain threshold, then the corresponding mobile node should enable additional radio links.

Conversely, when the failure rate drops, additional links may be turned down or used purely for monitoring purposes. This functionality could be implemented either centrally at the controller or even locally on the mobile nodes 404. However, in the central case, the predictive logic may have access to a richer dataset, to control the redundancy levels. When mobile nodes 404 move, their predicted future positions in $T_N$ seconds could also be used in the above analysis. In this manner, the amount of redundancy is precisely metered out to meet threshold network requirements so that spectrum strain and/or resource consumption is minimized while network work performance is maximized.

Figure 5:
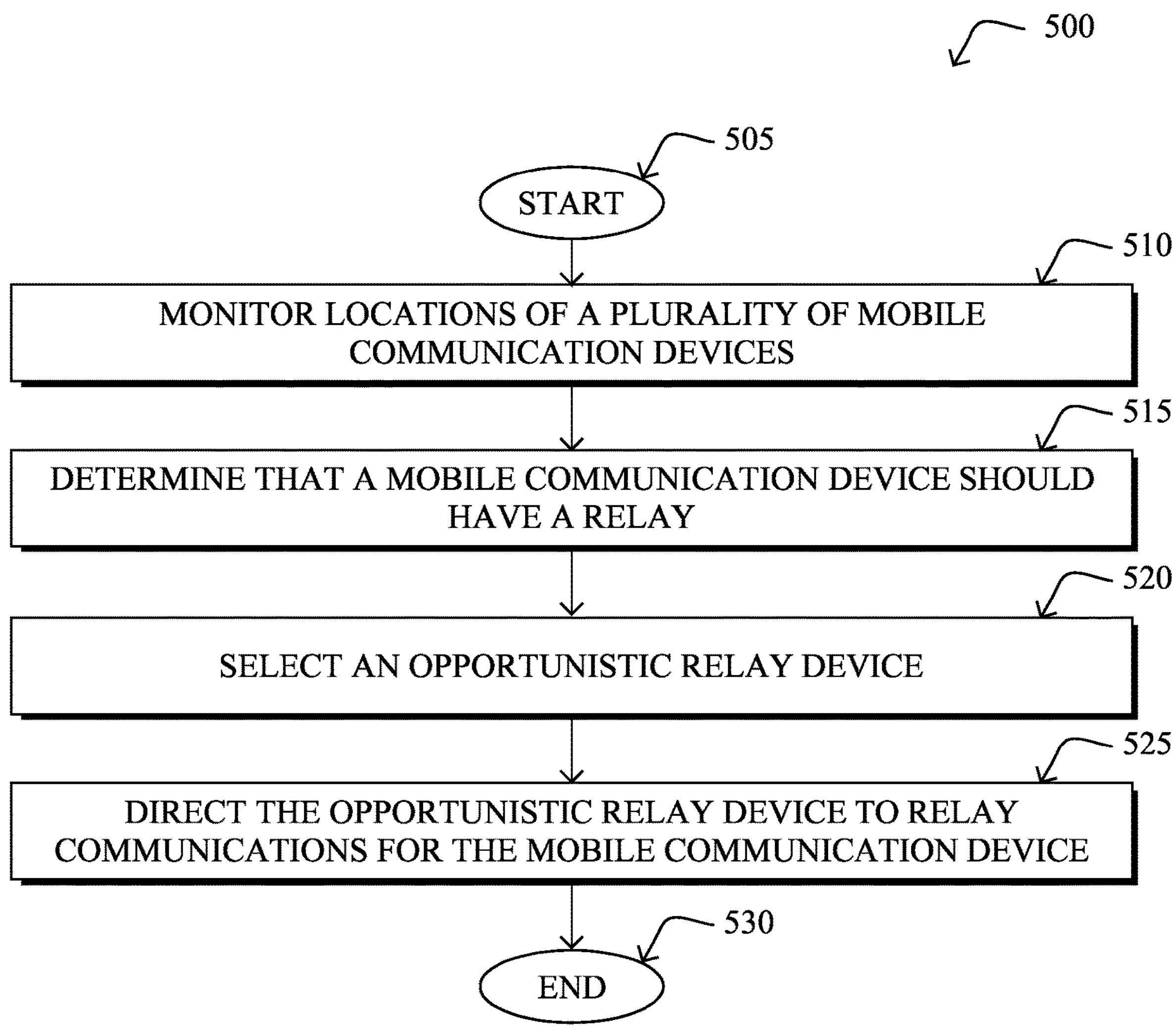
FIG. 5 illustrates an example simplified procedure for opportunistic relaying among mobile communication devices.

FIG. 5 illustrates an example simplified procedure for opportunistic relaying among mobile communication devices in a wireless communication network in accordance with one or more embodiments described herein. For example, a non-generic, specifically configured device (e.g., device 200) may perform procedure 500 by executing stored instructions (e.g., communication relaying process 248).

The procedure 500 may start at step 505, and continues to step 510, where, as described in greater detail above, dynamic locations of a plurality of mobile communication devices may be monitored within a physical area covered by a wireless communication network. The physical area may be a warehouse or industrial facility. The plurality of mobile communication devices may be autonomous robots. From a security standpoint, encryption keys may be distributed to the plurality of mobile communication devices at the time of their association to the wireless communication network. These keys may be utilized to encrypt relayed communications to prevent eavesdropping.

At step 515, it may be determined that a particular mobile communication device of the plurality of mobile communication devices should have a relay for communication with the wireless communication network. This determination may be based on a first location of the particular mobile communication device and/or inadequate wireless communication characteristics at the first location.

In various embodiments, this may include predicting that the particular mobile communication device is going to be in the first location. The particular mobile communication device may be a multi-link device capable of multiple wireless links at a time. The multi-link operation of the particular mobile communication device may be controlled based on determined redundancy levels of the wireless communication network. The determined redundancy levels may be determined based on a failure rate within the wireless communication network.

As detailed above, at step 520, an opportunistic relay device may be selected from the plurality of mobile communication devices. The opportunistic relay device may be selected based on a second location of the opportunistic relay device and adequate wireless communication characteristics of the opportunistic relay device within the wireless communication network and to the first location from the second location.

In various embodiments, this may include predicting that the opportunistic relay device is going to be in the second location. However, in some examples, the first and second locations may be current locations.

The wireless communication characteristics may be based on previously learned wireless communication patterns in the physical area (e.g., from prior monitoring operations). The opportunistic relay device may be selected based on load characteristics of communications within the wireless communication network. The load characteristics may be determined based on a failure rate of the communications within the wireless communication network.

At step 525, the opportunistic relay device may be directed to relay communications for the particular mobile communication device at the first location. The relayed communications may be encrypted based on the keys distributed at association. The communication may be relayed to an original access point of the particular mobile communication device or to a current access point of the opportunistic relay device.

In various embodiments, this may include directing the opportunistic relay device to move to the second location. Directing the opportunistic relay device to move to the second location may include one or more of: slowing the opportunistic relay device based on timing, accelerating the opportunistic relay device based on timing, and/or steering the opportunistic relay device.

With respect to security, the opportunistic relay device may utilize a basic service set identifier (BSSID) associated with the communication to deliver it to an appropriate access point. In various embodiments, a neighboring access point may be configured to recover an original frame of an encrypted communication for further processing. For instance, the original frame may be recovered based on a non-stream cipher and the relay key distributed at association time to encrypt relayed packet.

Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism to intelligently organize and orchestrate the secure use of opportunistic relay devices in a wireless communication network. By introducing a data-based approach to identifying when a relay is needed and which neighboring mobile communication devices are best suited to serve as that relay device, the resiliency and reliability of wireless communication networks is expanded into areas of an environment that are outside the coverage area of participating access points. Further, an approach is introduced which precisely meters out the amount of redundancy within a network and/or the amount of time and other resources devoted to data relay operations such that that spectrum strain and/or resource consumption is minimized while network work performance is maximized. Furthermore, the mechanisms are configured to support security measures in the data relays. The result is improved network connectivity and performance. This translates to, among other things, improved operations by mobile communication nodes and/or to execution of their underlying industrial processes.

According to the embodiments herein, an illustrative method herein may comprise: monitoring, by a process, dynamic locations of a plurality of mobile communication devices within a physical area covered by a wireless communication network, wherein keys are distributed to the plurality of mobile communication devices at association time; determining, by the process, that a particular mobile communication device of the plurality of mobile communication devices should have a relay for communication with the wireless communication network based on a first location of the particular mobile communication device and inadequate wireless communication characteristics at the first location; selecting, by the process, an opportunistic relay device from the plurality of mobile communication devices based on a second location of the opportunistic relay device and adequate wireless communication characteristics of the opportunistic relay device within the wireless communication network and to the first location from the second location; and directing, by the process, the opportunistic relay device to relay communications for the particular mobile communication device at the first location, wherein the communications are encrypted based on the keys.

In one embodiment, the method further comprises predicting that the particular mobile communication device is going to be in the first location. In one embodiment, the method further comprises predicting that the opportunistic relay device is going to be in the second location. In one embodiment, the method further comprises directing the opportunistic relay device to move to the second location. In one embodiment, directing the opportunistic relay device to move to the second location comprises one or more of: slowing the opportunistic relay device based on timing, accelerating the opportunistic relay device based on timing, and steering the opportunistic relay device. In one embodiment, the first location and the second location are current locations. In one embodiment, wireless communication characteristics are based on previously learned wireless communication patterns in the physical area. In one embodiment, the communication is relayed to an original access point of the particular mobile communication device or to a current access point of the opportunistic relay device.

In one embodiment, the opportunistic relay device uses a basic service set identifier (BSSID) associated with the communication to deliver it to an appropriate access point. In one embodiment, a neighboring access point is configured to recover an original frame of an encrypted communication for further processing. In one embodiment, the opportunistic relay device is selected based on load characteristics of communications within the wireless communication network. In one embodiment, the method further comprises determining the load characteristics based on a failure rate of the communications within the wireless communication network. In one embodiment, the particular mobile communication device is a multi-link device capable of multiple wireless links at a time. In one embodiment, the method further comprises controlling multi-link operation of the particular mobile communication device based on determined redundancy levels of the wireless communication network. In one embodiment, the method further comprises determining the determined redundancy levels based on a failure rate within the wireless communication network. In one embodiment, the physical area comprises a warehouse or industrial facility. In one embodiment, the plurality of mobile communication devices are autonomous robots.

According to the embodiments herein, an illustrative tangible, non-transitory, computer-readable medium having computer-executable instructions stored thereon that, when executed by a processor on a computer, cause the computer to perform a method comprising: monitoring dynamic locations of a plurality of mobile communication devices within a physical area covered by a wireless communication network, wherein keys are distributed to the plurality of mobile communication devices at association time; determining that a particular mobile communication device of the plurality of mobile communication devices should have a relay for communication with the wireless communication network based on a first location of the particular mobile communication device and inadequate wireless communication characteristics at the first location; selecting an opportunistic relay device from the plurality of mobile communication devices based on a second location of the opportunistic relay device and adequate wireless communication characteristics of the opportunistic relay device within the wireless communication network and to the first location from the second location; and directing the opportunistic relay device to relay communications for the particular mobile communication device at the first location, wherein the communications are encrypted based on the keys.

According to the embodiments herein, an illustrative apparatus comprising: one or more network interfaces to communicate with a network; a processor coupled to the one or more network interfaces and configured to execute one or more processes; and a memory configured to store a process that is executable by the processor, the process, when executed, configured to: monitor dynamic locations of a plurality of mobile communication devices within a physical area covered by a wireless communication network, wherein keys are distributed to the plurality of mobile communication devices at association time; determine that a particular mobile communication device of the plurality of mobile communication devices should have a relay for communication with the wireless communication network based on a first location of the particular mobile communication device and inadequate wireless communication characteristics at the first location; select an opportunistic relay device from the plurality of mobile communication devices based on a second location of the opportunistic relay device and adequate wireless communication characteristics of the opportunistic relay device within the wireless communication network and to the first location from the second location; and direct the opportunistic relay device to relay communications for the particular mobile communication device at the first location, wherein the communications are encrypted based on the keys While there have been shown and described illustrative embodiments that provide for opportunistic relaying among mobile communication devices, it is to be understood that various other adaptations and modifications may be made within the spirit and scope of the embodiments herein. For example, while certain embodiments are described herein with respect to using a single opportunistic relay device, the architectures are not limited as such and may include multiple opportunistic relay devices operating collectively and/or in phases, in other embodiments. In addition, while certain security protocols and approaches are described, such as BSSID and/or non-stream cipher and relay key schemes, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

monitoring, by a process, dynamic locations of a plurality of mobile communication devices within a physical area covered by a wireless communication network, wherein keys are distributed to the plurality of mobile communication devices at association time;

determining, by the process, that a particular mobile communication device of the plurality of mobile communication devices should have a relay for communication with the wireless communication network based on a first location of the particular mobile communication device and inadequate wireless communication characteristics at the first location;

selecting, by the process, an opportunistic relay device from the plurality of mobile communication devices based on a second location of the opportunistic relay device and adequate wireless communication characteristics of the opportunistic relay device within the wireless communication network and to the first location from the second location; and directing, by the process, the opportunistic relay device to relay communications for the particular mobile communication device at the first location, wherein the communications are encrypted based on the keys.

2. The method as in claim 1, further comprising:

predicting that the particular mobile communication device is going to be in the first location.

3. The method as in claim 2, further comprising:

predicting that the opportunistic relay device is going to be in the second location.

4. The method as in claim 2, further comprising:

directing the opportunistic relay device to move to the second location.

5. The method as in claim 4, wherein directing the opportunistic relay device to move to the second location comprises one or more of: slowing the opportunistic relay device based on timing, accelerating the opportunistic relay device based on timing, and steering the opportunistic relay device.

6. The method as in claim 1, wherein the first location and the second location are current locations.

7. The method as in claim 1, wherein wireless communication characteristics are based on previously learned wireless communication patterns in the physical area.

8. The method as in claim 1, wherein the communication is relayed to an original access point of the particular mobile communication device or to a current access point of the opportunistic relay device.

9. The method as in claim 1, wherein the opportunistic relay device uses a basic service set identifier (BSSID) associated with the communication to deliver it to an appropriate access point.

10. The method as in claim 1, wherein a neighboring access point is configured to recover an original frame of an encrypted communication for further processing.

11. The method as in claim 1, wherein the opportunistic relay device is selected based on load characteristics of communications within the wireless communication network.

12. The method as in claim 11, further comprising:

determining the load characteristics based on a failure rate of the communications within the wireless communication network.

13. The method as in claim 1, wherein the particular mobile communication device is a multi-link device capable of multiple wireless links at a time.

14. The method as in claim 13, further comprising:

controlling multi-link operation of the particular mobile communication device based on determined redundancy levels of the wireless communication network.

15. The method as in claim 14, further comprising:

determining the determined redundancy levels based on a failure rate within the wireless communication network.

16. The method as in claim 1, wherein the physical area comprises a warehouse or industrial facility.

17. The method as in claim 1, wherein the plurality of mobile communication devices are autonomous robots.

18. A tangible, non-transitory, computer-readable medium having computer-executable instructions stored thereon that, when executed by a processor on a computer, cause the computer to perform a method comprising:

monitoring dynamic locations of a plurality of mobile communication devices within a physical area covered by a wireless communication network, wherein keys are distributed to the plurality of mobile communication devices at association time;

determining that a particular mobile communication device of the plurality of mobile communication devices should have a relay for communication with the wireless communication network based on a first location of the particular mobile communication device and inadequate wireless communication characteristics at the first location;

selecting an opportunistic relay device from the plurality of mobile communication devices based on a second location of the opportunistic relay device and adequate wireless communication characteristics of the opportunistic relay device within the wireless communication network and to the first location from the second location; and directing the opportunistic relay device to relay communications for the particular mobile communication device at the first location, wherein the communications are encrypted based on the keys.

19. The tangible, non-transitory, computer-readable medium as in claim 18 further comprising:

predicting that the particular mobile communication device is going to be in the first location.

20. An apparatus, comprising:

one or more network interfaces to communicate with a network;

a processor coupled to the one or more network interfaces and configured to execute one or more processes; and a memory configured to store a process that is executable by the processor, the process, when executed, configured to:

monitor dynamic locations of a plurality of mobile communication devices within a physical area covered by a wireless communication network, wherein keys are distributed to the plurality of mobile communication devices at association time;

determine that a particular mobile communication device of the plurality of mobile communication devices should have a relay for communication with the wireless communication network based on a first location of the particular mobile communication device and inadequate wireless communication characteristics at the first location;

select an opportunistic relay device from the plurality of mobile communication devices based on a second location of the opportunistic relay device and adequate wireless communication characteristics of the opportunistic relay device within the wireless communication network and to the first location from the second location; and direct the opportunistic relay device to relay communications for the particular mobile communication device at the first location, wherein the communications are encrypted based on the keys.

* * * * *